(12) United States Patent
Takahashi et al.

(10) Patent No.: US 11,582,414 B2
(45) Date of Patent: Feb. 14, 2023

(54) SIGNAL PROCESSING APPARATUS, PHOTOELECTRIC CONVERSION APPARATUS, PHOTOELECTRIC CONVERSION SYSTEM, CONTROL METHOD OF SIGNAL PROCESSING APPARATUS, AND NON-TRANSITORY COMPUTER-READABLE STORAGE MEDIUM

(71) Applicant: CANON KABUSHIKI KAISHA, Tokyo (JP)

(72) Inventors: Keisuke Takahashi, Kanagawa (JP); Hidetoshi Hayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/481,550

(22) Filed: Sep. 22, 2021

(65) Prior Publication Data

US 2022/0094870 A1    Mar. 24, 2022

(30) Foreign Application Priority Data

Sep. 24, 2020  (JP) .............................. JP2020-160011
Jul. 7, 2021   (JP) .............................. JP2021-113140

(51) Int. Cl.
*H04N 5/365* (2011.01)
*H04N 5/232* (2006.01)
(Continued)

(52) U.S. Cl.
CPC ....... *H04N 5/3655* (2013.01); *H04N 5/23229* (2013.01); *H04N 5/243* (2013.01); *G06N 20/00* (2019.01)

(58) Field of Classification Search
CPC .. H04N 5/3655; H04N 5/23229; H04N 5/243; H04N 5/361; G06N 20/00; G06N 3/0675
See application file for complete search history.

(56) References Cited

U.S. PATENT DOCUMENTS

2017/0142359 A1* 5/2017 Ikedo ................... H04N 5/3655
2020/0244902 A1* 7/2020 Yoshikawa ............ H04N 5/378
(Continued)

FOREIGN PATENT DOCUMENTS

JP    2013-034064 A    2/2013
JP    2017-034315 A    2/2017
(Continued)

*Primary Examiner* — Hung H Lam
(74) *Attorney, Agent, or Firm* — Venable LLP

(57) ABSTRACT

A signal processing apparatus that processes image data output from a photoelectric conversion unit including a light-receiving region and a light-blocking region. The apparatus includes a control data generation unit that outputs control data used to generate correction data for correcting the image data using a trained model generated through machine learning, and a signal processing unit that generates the correction data on the basis of light-blocked image data and the control data, the light-blocked image data being image data, among the image data, that is from the light-blocking region, and corrects light-received image data in accordance with the correction data without applying the trained model, the light-received image data being image data, among the image data, that is from the light-receiving region.

17 Claims, 10 Drawing Sheets

(51) Int. Cl.
*H04N 5/243* (2006.01)
*G06N 20/00* (2019.01)

(56) References Cited

U.S. PATENT DOCUMENTS

2020/0314370 A1\* 10/2020 Takahashi ............ H04N 5/3745
2020/0351440 A1\* 11/2020 Seta ................... H04N 5/23225

FOREIGN PATENT DOCUMENTS

| JP | 2020-035443 A | 3/2020 |
| JP | 2020-123770 A | 8/2020 |

\* cited by examiner

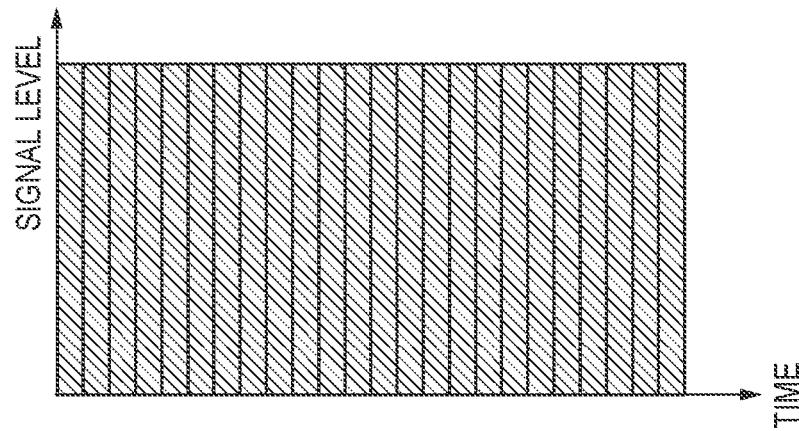
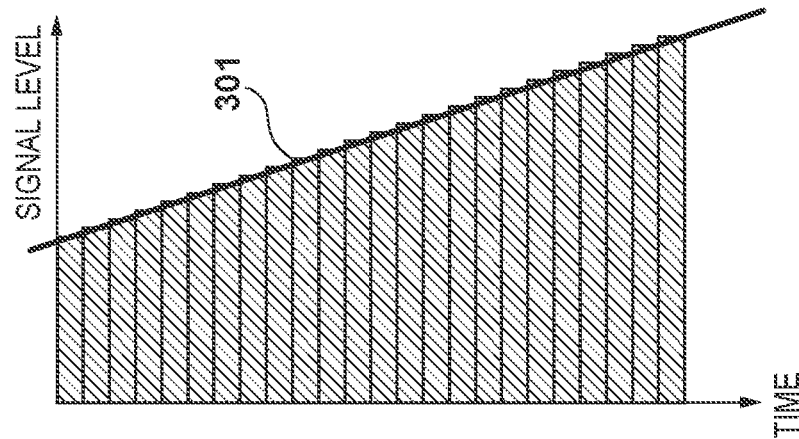
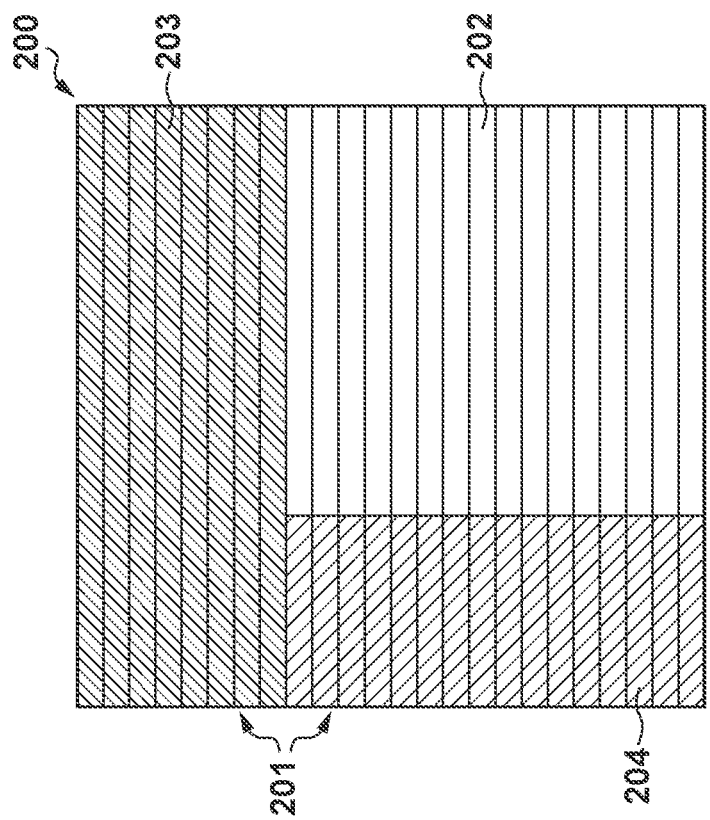

SIGNAL PROCESSING APPARATUS, PHOTOELECTRIC CONVERSION APPARATUS, PHOTOELECTRIC CONVERSION SYSTEM, CONTROL METHOD OF SIGNAL PROCESSING APPARATUS, AND NON-TRANSITORY COMPUTER-READABLE STORAGE MEDIUM

CROSS REFERENCE TO PRIORITY APPLICATION

This application claims the benefit of Japanese Patent Application No. 2020-160011, filed Sep. 24, 2020, and Japanese Patent Application No. 2021-113140, filed Jul. 7, 2021, which are hereby incorporated by reference herein in their entirety.

BACKGROUND OF THE INVENTION

Field of the Invention

The present invention relates to a signal processing apparatus, a photoelectric conversion apparatus, a photoelectric conversion system, a control method of a signal processing apparatus, and a non-transitory computer-readable storage medium.

Description of the Related Art

In image capturing devices using image sensors such as CMOS image sensors, it is necessary to correct noise caused by dark current and the like arising in each pixel in order to improve image quality. Japanese Patent Laid-Open No. 2017-034315 discloses dividing an image capturing region into multiple blocks, changing the size and division position of the blocks according to shooting conditions, and using correction values according to pre-stored division patterns to properly correct for a variety of shooting conditions.

SUMMARY OF THE INVENTION

In order to further improve image quality, it is necessary to more appropriately correct dark current produced in each pixel of the image sensor, noise caused by the circuitry for reading out signals from the pixels, and so on.

Some embodiments of the present invention provide techniques that are advantageous for improving the accuracy of corrections to signals output from an image sensor in a signal processing apparatus.

According to some embodiments, a signal processing apparatus that processes image data output from a photoelectric conversion unit including a light-receiving region and a light-blocking region, the apparatus comprising a control data generation unit that outputs control data used to generate correction data for correcting the image data using a trained model generated through machine learning, and a signal processing unit that generates the correction data on the basis of light-blocked image data and the control data, the light-blocked image data being image data, among the image data, that is from the light-blocking region, and corrects light-received image data in accordance with the correction data without applying the trained model, the light-received image data being image data, among the image data, that is from the light-receiving region.

According to some other embodiments, a control method of controlling a signal processing apparatus that processes image data output from a photoelectric conversion unit including a light-receiving region and a light-blocking region, the method comprising outputting control data used to correct the image data using a trained model generated through machine learning, generating correction data on the basis of light-blocked image data and the control data, the light-blocked image data being image data, among the image data, that is from the light-blocking region, and correcting light-received image data in accordance with the correction data, the light-received image data being image data, among the image data, that is from the light-receiving region.

According to still other embodiments, a non-transitory computer-readable storage medium storing a program that causes a computer to execute a control method of controlling a signal processing apparatus that processes image data output from a photoelectric conversion unit including a light-receiving region and a light-blocking region, the method comprising outputting control data used to correct the image data using a trained model generated through machine learning, generating correction data on the basis of light-blocked image data and the control data, the light-blocked image data being image data, among the image data, that is from the light-blocking region; and correcting light-received image data in accordance with the correction data, the light-received image data being image data, among the image data, that is from the light-receiving region.

Further features of the present invention will become apparent from the following description of exemplary embodiments (with reference to the attached drawings).

BRIEF DESCRIPTION OF THE DRAWINGS

FIGS. 3A to 3C are conceptual diagrams illustrating OB clamp processing for reading noise components of image data in the signal processing apparatus according to an embodiment.

DESCRIPTION OF THE EMBODIMENTS

Figure 1:
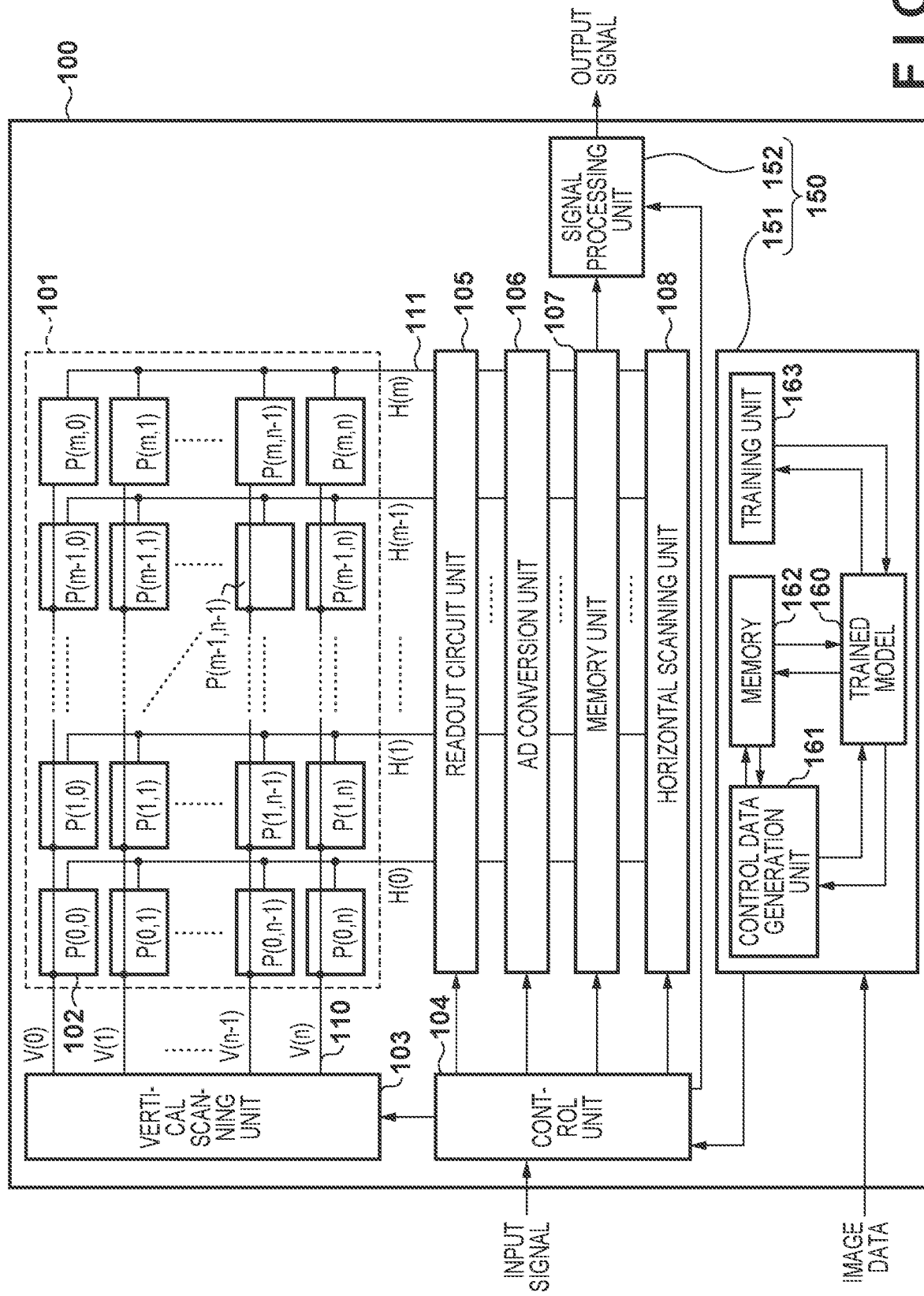
FIG. 1 is a diagram illustrating an example of the configuration of a photoelectric conversion apparatus including a signal processing apparatus according to an embodiment.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A signal processing apparatus according to a first embodiment of the present disclosure will be described with reference to FIGS. 1 to 5. FIG. 1 is a diagram illustrating an example of the configuration of a photoelectric conversion apparatus 100 including a signal processing apparatus 150 according to the present embodiment. The photoelectric conversion apparatus 100 includes the signal processing apparatus 150, as well as a photoelectric conversion unit 101 (described later) that includes a light-receiving region and a light-blocking region and that outputs image data processed by the signal processing apparatus 150. The photoelectric conversion apparatus 100 can also include a vertical scanning unit 103, a control unit 104, a readout circuit unit 105, an AD conversion unit 106, a memory unit 107, and a horizontal scanning unit 108.

The signal processing apparatus 150 includes a machine learning unit 151 and a signal processing unit 152. The machine learning unit 151 includes a trained model 160 generated through machine learning, and a control data generation unit 161 that, on the basis of image data, outputs control data used when generating correction data for correcting the image data by the signal processing unit 152 using the trained model 160. The signal processing unit 152 generates the correction data on the basis of the image data and the control data generated by the control data generation unit 161, and corrects the image data output from the photoelectric conversion unit 101 in accordance with the correction data. Although the present embodiment describes an example in which the signal processing apparatus 150 is provided in the photoelectric conversion apparatus 100, the configuration is not limited thereto, and the signal processing apparatus 150 may be an entity separate from the photoelectric conversion apparatus 100.

The photoelectric conversion unit 101 is constituted by (m+1)×(n+1) pixels, with m+1 pixels 102 arranged in a row direction (the horizontal direction in FIG. 1) and n+1 pixels 102 in a column direction (the vertical direction in FIG. 1). The vertical scanning unit 103 is connected to the m+1 pixels 102 provided in each row by row selection lines 110 (V(n)), and selects a row for reading out signals. In the selected row, signals output from the m+1 pixels 102 included in the selected row are read out simultaneously to the readout circuit unit 105 via vertical output lines 111 (H(m)). The readout circuit unit 105 may include an amplifier or the like and amplify the signals output from the pixels 102. The signals output from the readout circuit unit 105 are converted from analog signals to digital signals (AD conversion) by the AD conversion unit 106, and are temporarily stored in the memory unit 107. Then, the digital signals, which are addressed by the horizontal scanning unit 108, are sequentially read out to the signal processing unit 152 of the signal processing apparatus 150, and digital signal processing is performed in the signal processing unit 152. The control unit 104 includes a timing generator, for example, and can generate control signals for the various components of the photoelectric conversion apparatus 100. In addition, the control unit 104 can obtain setting information, such as image capturing conditions used during image capturing by the photoelectric conversion apparatus 100, by communicating with the exterior of the photoelectric conversion apparatus 100, and can supply control signals according to the conditions to the various components included in the photoelectric conversion apparatus 100. The control unit 104 controls the vertical scanning unit 103, the readout circuit unit 105, the AD conversion unit 106, the memory unit 107, the horizontal scanning unit 108, and the signal processing unit 152 on the basis of this setting information.

The signal processing unit 152 performs processing for reducing reset noise produced by switching elements included in each of the pixels 102 of the photoelectric conversion unit 101 (e.g., MOS transistors). The image data output from the photoelectric conversion unit 101 can contain dark current produced from photodiodes included in the pixels 102, variation produced by differences in circuit factors such as power source impedance and signal delay (fixed pattern noise, or FPN), and the like. In the present specification, a state in which this FPN varies from row to row and column to column with a given regularity will be called "shading". After reducing a reset noise component, the signal processing unit 152 performs processing for reducing an FPN component, a shading component, and the like, and extracting, from the image data, a signal component in which noise components have been suppressed. In the present specification, the processing for reducing noise components of the image data, performed by the signal processing unit 152, will be called "OB clamp processing".

Figure 2:
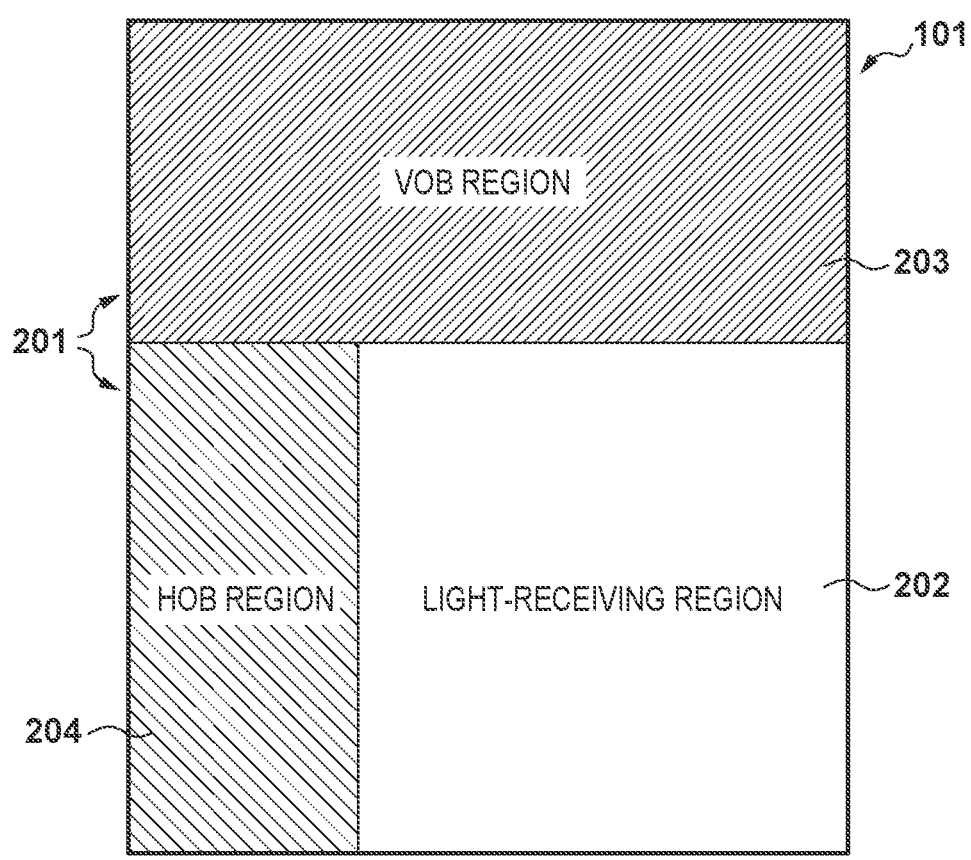
FIG. 2 is a conceptual diagram illustrating an output signal from a photoelectric conversion unit of the photoelectric conversion apparatus illustrated in FIG. 1.

FIG. 2 is a conceptual diagram illustrating signals output from the photoelectric conversion unit 101 in the present embodiment, on a line-by-line basis. The photoelectric conversion unit 101 includes a light-receiving region 202, which receives light that is incident through an optical system such as a lens, and a light-blocking region 201 (which can also be called an "optical black (OB) region") that optically blocks incident light. The light-blocking region 201 is a reference region for determining what is known as a black level reference in the image data obtained by the photoelectric conversion unit 101. Of the light-blocking region 201, the region where the pixels 102 are optically blocked across all rows in an upper area of the screen, as illustrated in FIG. 2, will be called a VOB region 203. A region located on the left side of the light-receiving region 202 and in which the pixels 102 are optically blocked throughout all rows will be called an HOB region 204.

To reduce the FPN component for each row and each column in the OB clamp processing, the signal processing unit 152 generates the correction data from light-blocked image data, which is image data of the light-blocking region 201 among the image data. Next, the signal processing unit 152 corrects light-received image data, which is image data of the light-receiving region 202 among the image data, according to the correction data. For example, the signal processing unit 152 generates the correction data by averaging the signal levels (signal values) of the light-blocked image data on a row-by-row and column-by-column basis. Next, the signal processing unit 152 may generate image display data by subtracting the respective signal levels of the correction data from the corresponding respective signal levels of the light-received image data. Here, any region in the light-blocking region 201 can be set as a region for obtaining the average values of the signal levels row by row and column by column in the light-blocking region 201. This region will be called a "clamp value generation region". An average value obtained from the clamp value generation region will be called a "clamp value".

FIGS. 3A to 3C are conceptual diagrams illustrating the OB clamp processing. FIG. 3A illustrates the photoelectric conversion unit 101 illustrated in FIG. 2, FIG. 3B is a conceptual diagram illustrating a state from before the OB clamp processing is performed, and FIG. 3C is a conceptual diagram illustrating a state from after the OB clamp processing has been performed. FIG. 3B illustrates an example of the average value of the FPN component level and the corresponding signal level, with time on the vertical axis and the signal level of the light-blocking region 201 on the horizontal axis. FIG. 3B is a conceptual diagram in which the FPN component increases with each row, and a clamp value 301 is indicated for a case when the entire light-blocking region 201 is used as the clamp value generation region. FIG. 3C illustrates a result of subtracting the clamp value 301 from the signal level of each row. FIG. 3C illustrates a state in which signal components suppressing the FPN component, the shading component, and the like, have been successfully extracted from the image data obtained from the photoelectric conversion unit 101, including the light-receiving region 202, by subtracting the clamp value 301 from the signal levels obtained in the light-blocking region 201. In other words, FIG. 3C illustrates an example in which the OB clamp processing by the signal processing unit 152 has been performed appropriately.

However, in the OB clamp processing, if the average value of each row of the light-blocked image data of the light-blocking region 201 in the image data is used for subtraction as-is, the average value may vary due to random noise and the like that vary from pixel to pixel. As a result, the shading component cannot be properly reduced in the OB clamp processing, and the accuracy of the OB clamp processing may drop as a result.

It is therefore conceivable to, for example, use a LPF (Low Pass Filter) on the average values of the light-blocked image data obtained for each row to make the clamp value resistant to row-to-row variations and improve the accuracy of the OB clamp processing. It is therefore necessary to provide control data to the signal processing unit 152 for performing the OB clamp processing when the signal processing unit 152 performs the OB clamp processing. The signal processing unit 152 generates the stated correction data on the basis of the light-blocked image data, which is the image data of the light-blocking region 201 among the image data, and the control data. In addition to information on LPF feedback gain (tracking ability with respect to shading), the control data used when performing the OB clamp processing is information on the size of the clamp value generation region used for the OB clamp processing among the light-blocked image data, information on the location of the clamp value generation region, and the like. The control data generation unit 161 provided in the machine learning unit 151 of the signal processing apparatus 150 generates this control data using the trained model 160. The signal processing unit 152 generates the correction data on the basis of the information of the light-blocked image data and the stated control data, and can generate the image display data by, for example, subtracting the signal level of the correction data from the signal level of the light-received image data as described above.

Figure 4:
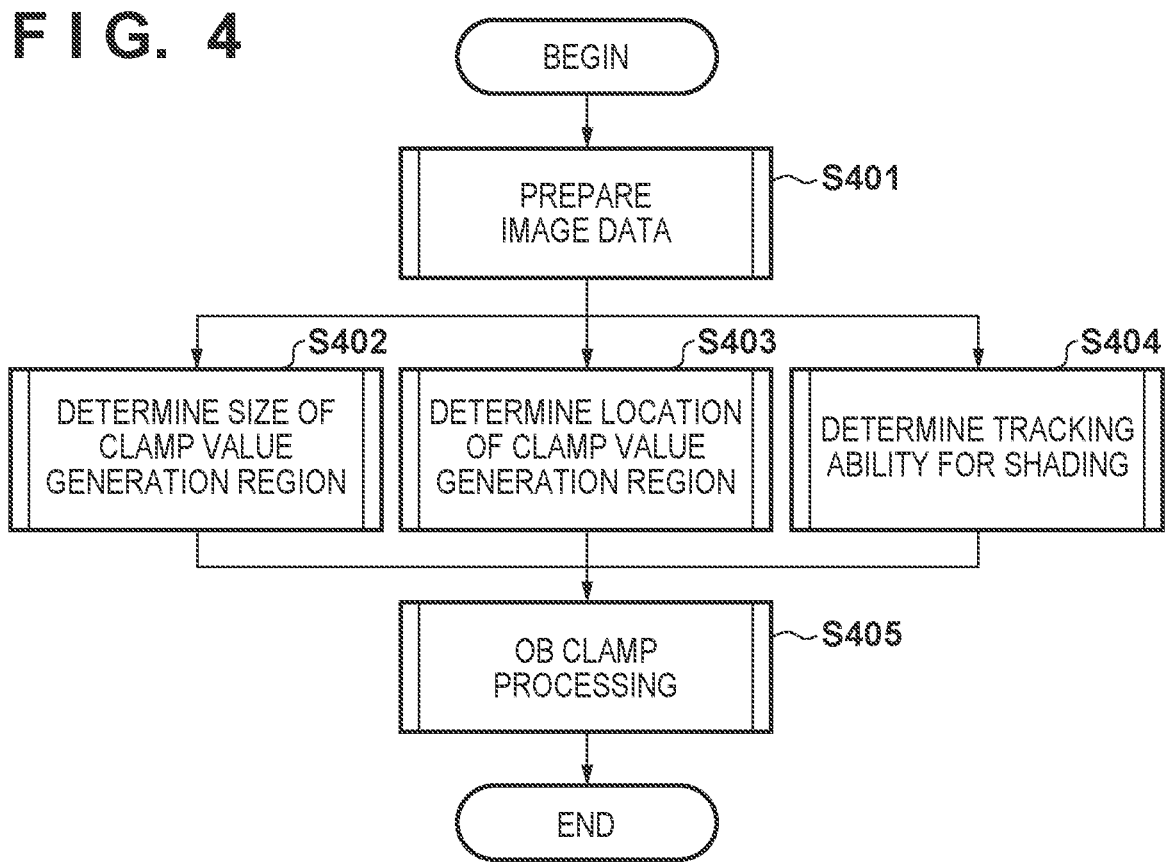
FIG. 4 is a flowchart illustrating the generation of control data used in the correction by the signal processing apparatus according to an embodiment.

A process for generating the control data will be described next with reference to FIG. 4. First, in step S401, image data for generating the control data is prepared. The image data for generating the control data may be image data obtained through image capturing performed up until that point, or may be image data obtained under equivalent image capturing conditions. Such image data may be supplied from outside the signal processing apparatus 150, the photoelectric conversion apparatus 100, or the like, or as illustrated in FIG. 1, memory 162 may be provided in the machine learning unit 151 of the signal processing apparatus 150, and the image data may be stored in the memory 162. The light-blocked image data, which is data of the light-blocking region 201 among the image data obtained in real time, may be used as the image data for generating the control data.

Once the image data for generating the control data is prepared, the process moves to steps S402 to S404. In step S402, the control data generation unit 161 determines, as the control data, the size of the region for generating the correction data among the light-blocked image data (the clamp value generation region), i.e., average parameters used when generating the clamp value. The average parameters used when generating the clamp value may be determined, for example, from the magnitude of the noise amount of the FPN component in the light-blocking region 201. For example, when there is a large amount of noise, the clamp value generation region is set to be larger in order to suppress large variations, whereas when there is a small amount of noise, the size of the clamp value generation region is set to be smaller so as not to be unnecessarily affected by stains, nonuniformities, or the like present in the light-blocking region 201.

In step S403, the control data generation unit 161 determines, as the control data, the location of a region, among the light-blocked image data, for generating the correction data (the clamp value generation region). The location of the clamp value generation region is determined from the shape of the shading in the light-blocking region 201, and furthermore from the location of pixels outputting abnormal signal values. A "pixel outputting an abnormal signal" can be, for example, a pixel in a region of a stain, a nonuniformity, or the like as mentioned above, a pixel that is defective, or the like. Stains and nonuniformities can appear due to a collection of pixels that output signal levels that are relatively higher or lower than other pixels. A "pixel that is defective" can be a pixel that continuously outputs the same signal level, such as a white defect or a black dot. If stains or nonuniformities are present in the clamp value generation region, the clamp value may contain components other than the desired FPN component, and the FPN component may not be reduced, which may make performing proper OB clamp processing impossible. As such, when stains, nonuniformities, or the like, are present in the light-blocked image data of the light-blocking region 201, the clamp value generation region can be set to exclude the region in which the stains, nonuniformities, or the like are present.

Furthermore, in step S404, the control data generation unit 161 determines tracking ability for shading as the control data. For example, the tracking ability for shading may be determined from the magnitude of the shading component. For example, when there is a large amount of shading, the tracking ability of the clamp value is set to be higher, and the clamp value is set to be able to track a higher shading amount. When there is a small amount of shading, the tracking ability is set to be lower so that the clamp value is not affected by unwanted variations.

Steps S402 to S404 may be performed in any order. Additionally, steps S402 to S404 may be performed simultaneously, in parallel, for example. Furthermore, for example, not all of steps S402 to S404 need be executed. The accuracy of the OB clamp processing performed by the signal processing unit 152 can be improved by executing at least one of these steps and having the control data be output from the control data generation unit 161 to the signal processing unit 152.

The control data generation unit 161 outputs, to the signal processing unit 152, control data including at least one of the information on the size of the clamp value generation region, the information on the location of the clamp value generation region, and the information on the tracking ability with respect to shading, which have been determined in steps S402 to S404. Next, in step S405, the signal processing unit 152 generates the correction data on the basis of the control data determined in steps S402 to S404 and the light-blocked image data of the light-blocking region 201, and performs the OB clamp processing for correcting the light-received image data of the light-receiving region 202 in accordance with the correction data. Through this, in the present embodiment, a clamp value that conforms to the image capturing conditions can be calculated as the correction data, and appropriate OB clamp processing capable of reducing the FPN component, the shading component, and the like, can be performed. An image having good image quality can be obtained as a result.

Here, the image data from the photoelectric conversion unit 101 of the photoelectric conversion apparatus 100 may have different FPN components, nonuniformities, and so on, from chip to chip, even under the same image capturing conditions, due to defects arising during the manufacturing process of the photoelectric conversion unit 101, the location of the chips in each lot, and the like, for example. For example, even within the same lot, the thicknesses of interlayer films differ from chip to chip, and the size of wiring capacitance varies from chip to chip as a result. When the size of the wiring capacitance varies, the shading amount, shape, and so on, may also vary from chip to chip. When the chip size of the photoelectric conversion unit 101 is large, as in the case of image sensors used in digital single-lens cameras, the effects of such variation are greater. Accordingly, it is very important for the control data generation unit 161 to tune the trained model 160 for generating the control data before shipment in order to implement OB clamp processing suited to FPN components, nonuniformities, and the like, that vary from chip to chip.

Even in the same photoelectric conversion unit 101, the FPN component is a value that can vary with each image capturing condition, such as the amount of dark current produced according to the storage time when an image is captured, as well as the amplification rate of the FPN component according to the ISO setting, and the like. Furthermore, even if not present at the time of shipment, the image output from the photoelectric conversion unit 101 may have stains, nonuniformities, or the like, due to changes over time. If the OB clamping processing cannot be performed appropriately each time due to these effects, the FPN component, shading component, and the like will, not be able to be reduced, which may make it impossible to maintain the accuracy of the OB clamp processing.

Accordingly, in the present embodiment, the control data generation unit 161 inputs image data (the light-blocked image data) into the trained model 160, and causes the control data for executing the OB clamp processing to be output. In other words, the control data generation unit 161 causes the control data for reducing the FPN component to be output by using a trained model that has undergone machine learning of shading shapes, stains, nonuniformities, and the like, that differ depending on the image capturing conditions, the lot, and the chip.

In the present embodiment, the control data generation unit 161 does not cause the trained model 160 to output the clamp value itself, but rather causes the control data for generating the clamp value to be output. Additionally, the signal processing unit 152 generates the correction data on the basis of the control data and the light-blocked image data of the light-blocking region 201, and executes the OB clamp processing for correcting the light-received image data of the light-receiving region 202 according to the correction data without applying the trained model 160. By doing so, for example, the area of the memory 162 can be reduced compared to a case when the clamp value itself is held in the memory 162. Furthermore, if the clamp value itself is held in the memory 162, it is necessary to access the memory 162 for each frame. However, in the present embodiment, when no change in the control data is required, e.g., when shooting continuously without changing the shooting conditions, there is no need to access memory 162, and shooting at a high frame rate can be achieved.

Additionally, the machine learning unit 151 may further include a training unit 163 that updates the trained model 160 through machine learning using the image data. By repeatedly capturing images with the photoelectric conversion apparatus 100, the training unit 163 may, for example, capture the statistical characteristics of the obtained image data with respect to the image capturing conditions and update the trained model 160. This makes it possible for the trained model 160 to adapt to the occurrence of stains, nonuniformities, and the like, over time, for example. The machine learning by the training unit 163 in this case can be called unsupervised learning.

Figure 5:
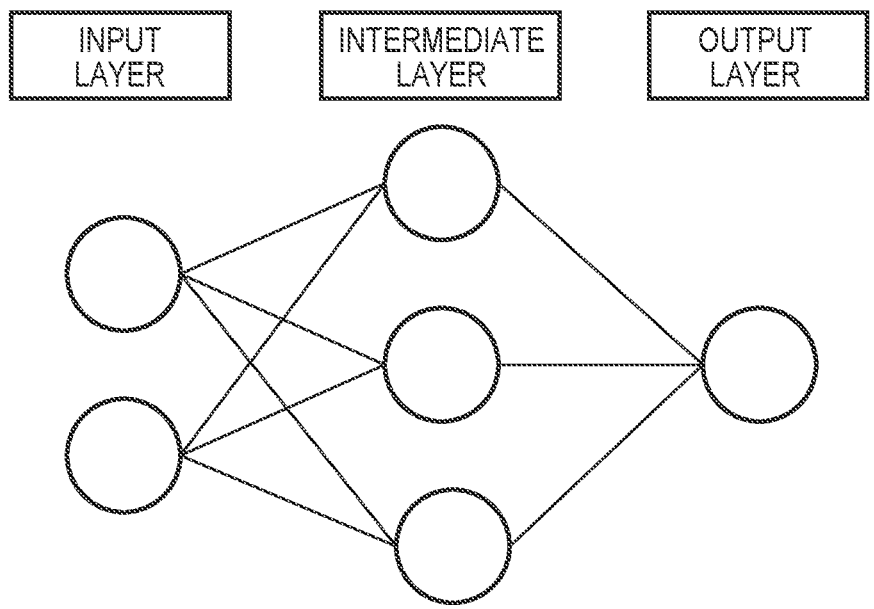
FIG. 5 is a diagram illustrating a machine learning model of the signal processing apparatus according to an embodiment.

FIG. 5 is a schematic diagram of a neural network of the machine learning model according to the present embodiment. The neural network can include an input layer having a plurality of nodes, an intermediate layer having a plurality of nodes, and an output layer having a single node. Image data is input to each node of the input layer. Each node in the intermediate layer is connected to each node in the input layer. Each element of an input value input to each node of the intermediate layer is used in an operation at each node of the intermediate layer. Each node in the intermediate layer calculates an arithmetic value using, for example, the input value from each of the input value nodes, a predetermined weighting coefficient, and a predetermined bias value. Each node in the intermediate layer is connected to the output layer, and outputs the calculated arithmetic value to the node in the output layer. The node in the output layer is input with arithmetic values from each node in the intermediate layer. The machine learning model (intermediate layer) derives, from the input image data, control data that can reduce the FPN component under various image capturing conditions. If the OB clamp processing is performed on the basis of the control data derived in this manner, it will be possible to perform highly accurate OB clamp processing that adapts not only to FPN components and shading components that vary depending on the image capturing conditions and the chips, but also to changes over time. As a result, in the present embodiment, an image having good image quality can be obtained.

Figure 6:
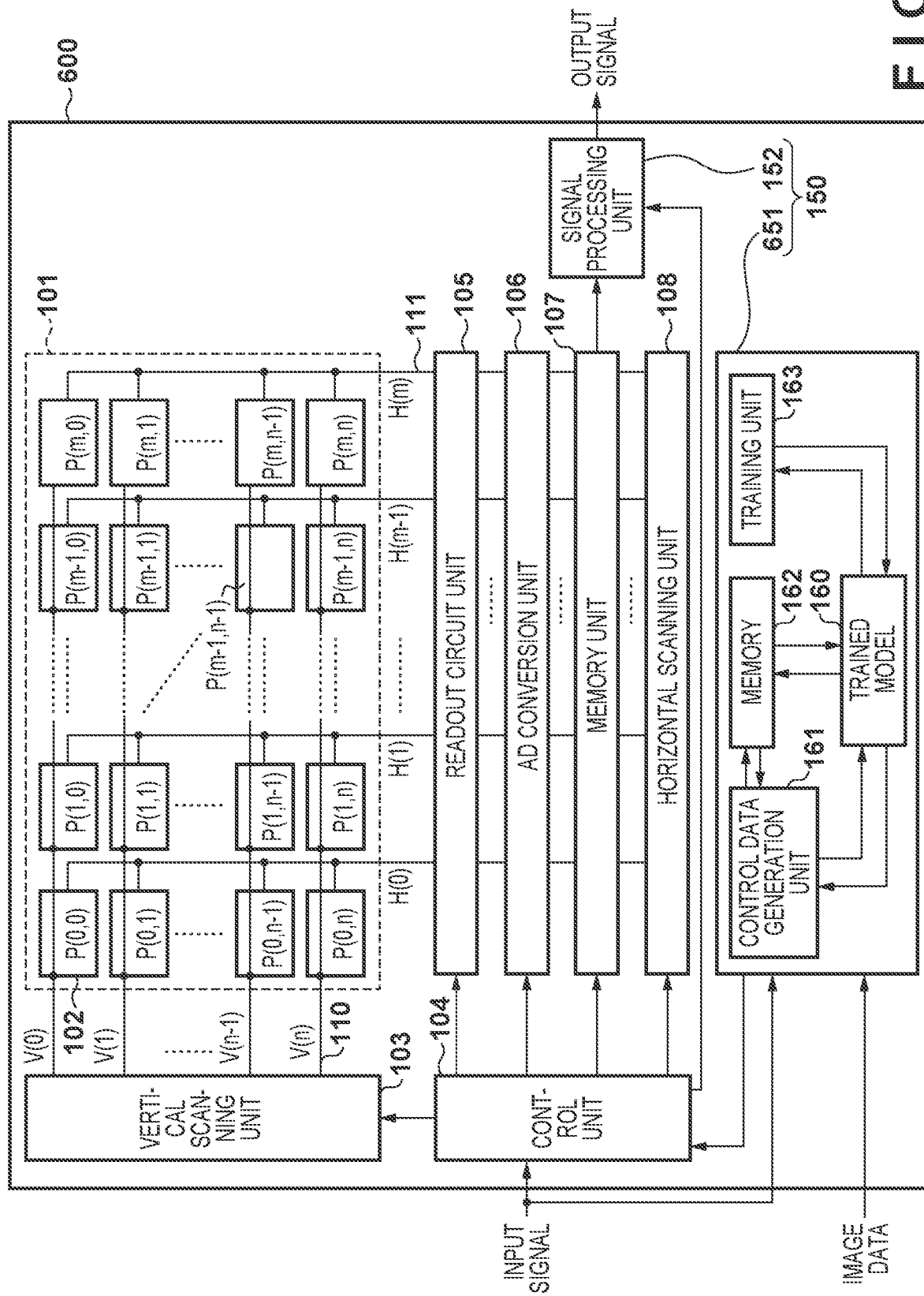
FIG. 6 is a diagram illustrating an example of the configuration of a photoelectric conversion apparatus including a signal processing apparatus according to an embodiment.

A signal processing apparatus according to a second embodiment of the present disclosure will be described with reference to FIG. 6. FIG. 6 is a diagram illustrating an example of the configuration of a photoelectric conversion apparatus 600 including a signal processing apparatus 150 according to the present embodiment. The signal processing apparatus 150 of the present embodiment differs from the first embodiment described above in that the machine learning unit 151 of the signal processing apparatus 150 illustrated in FIG. 1 has been replaced with a machine learning unit 651. Compared to the machine learning unit 151, the machine learning unit 651 has an additional signal line for obtaining signals from outside the photoelectric conversion apparatus 600. Because configurations aside from the configuration of the machine learning unit 651 may be the same as in the first embodiment described above, the following will focus on the points that differ from the first embodiment described above, and will omit descriptions of points that may be the same, as appropriate.

The foregoing first embodiment described how appropriate OB clamp processing can be executed by using the trained model 160 and having the control data generation unit 161 derive control data adapted to each chip, the image capturing conditions, and the like, from the image data. Additionally, the first embodiment described that the training unit 163 may perform unsupervised learning. On the other hand, in the present embodiment, the training unit 163 updates the trained model 160 by performing machine learning using supervised data. Then, as in the first embodiment described above, the control data generation unit 161 generates, using the trained model 160, control data used by the signal processing unit 152 in the OB clamp processing.

More specifically, in the present embodiment, data obtained by removing FPN components, shading components, and the like, from the image data is provided from outside the signal processing apparatus 150 (the photoelectric conversion apparatus 600). For example, a user provides data from which the FPN component, the shading component, and the like, have been removed. The training unit 163 performs machine learning using the data provided from outside the signal processing apparatus 150, which is data in which noise has been reduced from the image data, as the supervised data.

For example, the training unit 163 compares the correction data generated by the signal processing unit 152 on the basis of the control data generated by the control data generation unit 161 using the trained model 160, and the supervised data in which noise has been reduced from the same image data or image data obtained under the same image capturing conditions. This enables the training unit 163 to perform machine learning so that the control data generation unit 161 can generate control data suited to the chip, the image capturing conditions, and the like, using the trained model 160. The training unit 163 updates the trained model 160 on the basis of the result of this comparison. Additionally, for example, the training unit 163 may perform machine learning using, as the supervised data, data based on the control data output by the control data generation unit 161 that can reduce noise in the image data, the data being input from outside the signal processing apparatus 150.

The machine learning executed by the training unit 163 may be performed before shipping the photoelectric conversion apparatus 100, for example. Alternatively, the training unit 163 may perform the machine learning after the photoelectric conversion apparatus 100 has been shipped, e.g., when the photoelectric conversion apparatus 100 starts up or shuts down, while charging a battery, or the like. Furthermore, the training unit 163 may perform the machine learning as needed in response to requests from the user, a photoelectric conversion system (described later), or the like.

In the above-described first embodiment and the present embodiment, the training unit 163 is provided in the machine learning unit 651, but the configuration is not limited thereto. For example, the training unit 163 may be provided in the signal processing unit 152, or may be provided separate from the machine learning unit 151 and the signal processing unit 152.

In the present embodiment, the machine learning is performed using supervised data. Through this, if the OB clamp processing is performed on the basis of the control data generated by the control data generation unit 161 using the trained model 160 that is updated as appropriate, FPN components, shading components, and the like, that vary depending on the image capturing conditions and the chip can be reduced with high accuracy. This furthermore enables highly accurate OB clamp processing that can adapt to changes over time. As a result, in the present embodiment, an image having good image quality can be obtained.

Figure 7:
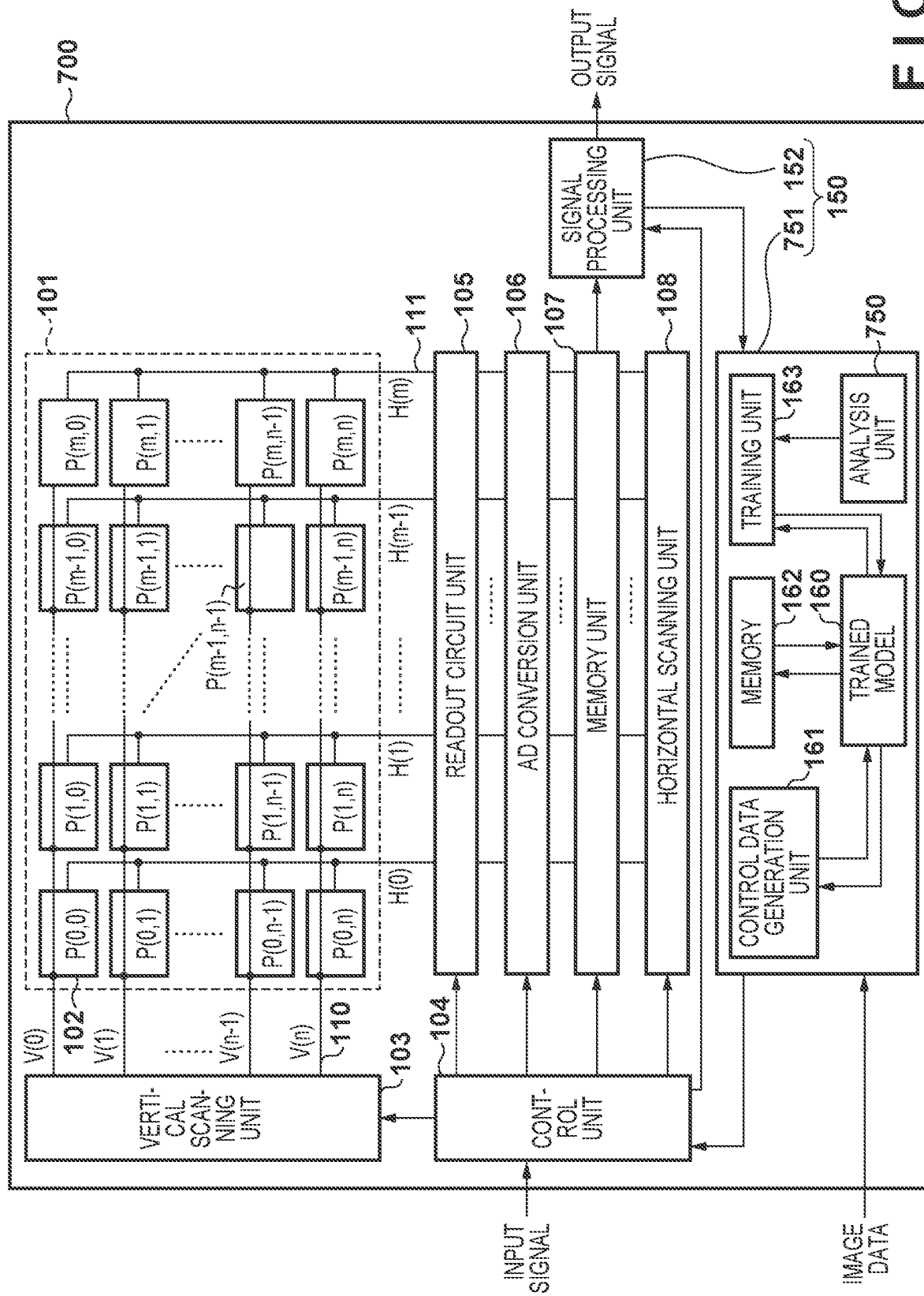
FIG. 7 is a diagram illustrating an example of the configuration of a photoelectric conversion apparatus including a signal processing apparatus according to an embodiment.

A signal processing apparatus according to a third embodiment of the present disclosure will be described with reference to FIG. 7. FIG. 7 is a diagram illustrating an example of the configuration of a photoelectric conversion apparatus 700 including a signal processing apparatus 150 according to the present embodiment. The signal processing apparatus 150 of the present embodiment differs from the first embodiment described above in that the machine learning unit 151 of the signal processing apparatus 150 illustrated in FIG. 1 has been replaced with a machine learning unit 751. Compared to the machine learning unit 151, the machine learning unit 751 has an additional signal line for obtaining signals from the signal processing unit 152. The machine learning unit 751 further includes an analysis unit 750. Because configurations aside from the configuration of the machine learning unit 751 may be the same as in the first embodiment described above, the following will focus on the points that differ from the first embodiment described above, and will omit descriptions of points that may be the same, as appropriate.

The foregoing second embodiment described the training unit 163 performing machine learning and updating the trained model 160 using, as supervised data, data that has been received from outside the signal processing apparatus 150 (the photoelectric conversion apparatus 600). In the present embodiment, the signal processing unit 152 performs the OB clamp processing using the control data generated by the control data generation unit 161, and performs learning using a result of the OB clamp processing as the supervised data. More specifically, the analysis unit 750 analyzes the degree of noise reduction in the correction data generated by the signal processing unit 152 on the basis of the control data generated by the control data generation unit 161. The analysis unit 750 analyzes the correction data generated by the signal processing unit 152 and feeds back a result of determining the accuracy of the OB clamp processing (the degree to which noise in the correction data has been reduced) as the supervised data, and the training unit 163 performs the machine learning. In other words, in the present embodiment, the supervised data is generated within the signal processing apparatus 150, unlike in the foregoing second embodiment. The signal line from the signal processing unit 152 to the machine learning unit 751 illustrated in FIG. 7 is provided in order to transfer corrected image data, on which the OB clamp processing has been performed by the signal processing unit 152, to the analysis unit 750.

The machine learning performed by the training unit 163 in the present embodiment can be called reinforcement learning. The machine learning may be performed each time the signal processing unit 152 corrects the light-received image data according to the correction data and generates the corrected image data. Increasing the number of instances of supervised data may increase the accuracy of the OB clamp processing.

An example of a method for analyzing the degree of FPN component removal by the OB clamp processing, performed by the analysis unit 750, will be described below. For the input image data, the analysis unit 750 sets a given region in the light-blocked image data of the light-blocking region 201. This region will be called an "FPN shape calculation region". Next, the analysis unit 750 finds an average value of the signal level for each row and each column in the FPN shape calculation region, and calculates an approximated curve for the average values. This approximated curve serves as a function expressing the FPN shape. Here, an ideal state in which the FPN component has been completely removed is a state in which the slope of the approximated curve is zero. The degree of reduction of the FPN component can be determined by finding the correlation between the approximated curve calculated by the analysis unit 750 and a function in which the slope of the approximated curve in the ideal state is set to zero. The degree of noise reduction analyzed by the analysis unit 750 is input to the training unit 163 and utilized as the supervised data.

In the present embodiment, the training unit 163 and the analysis unit 750 are provided in the machine learning unit 751, but the configuration is not limited thereto. For example, the training unit 163 and the analysis unit 750 may be provided in the signal processing unit 152, or may be provided separately from the machine learning unit 151 and the signal processing unit 152. The training unit 163 and the analysis unit 750 may be configured in an integrated manner as well. By having the user use the photoelectric conversion apparatus 100 under various image capturing conditions, a wide range of supervised data can be obtained, which is expected to improve the training accuracy in a shorter period of time.

In the present embodiment, the supervised data is generated, and the machine learning is performed, within the signal processing apparatus 150. Through this, if the OB clamp processing is performed on the basis of the control data generated by the control data generation unit 161 using the trained model 160 that is updated as appropriate, FPN components, shading components, and the like, that vary depending on the image capturing conditions and the chip can be reduced with high accuracy. This furthermore enables highly accurate OB clamp processing that can adapt to changes over time. As a result, in the present embodiment, an image having good image quality can be obtained.

Figure 8:
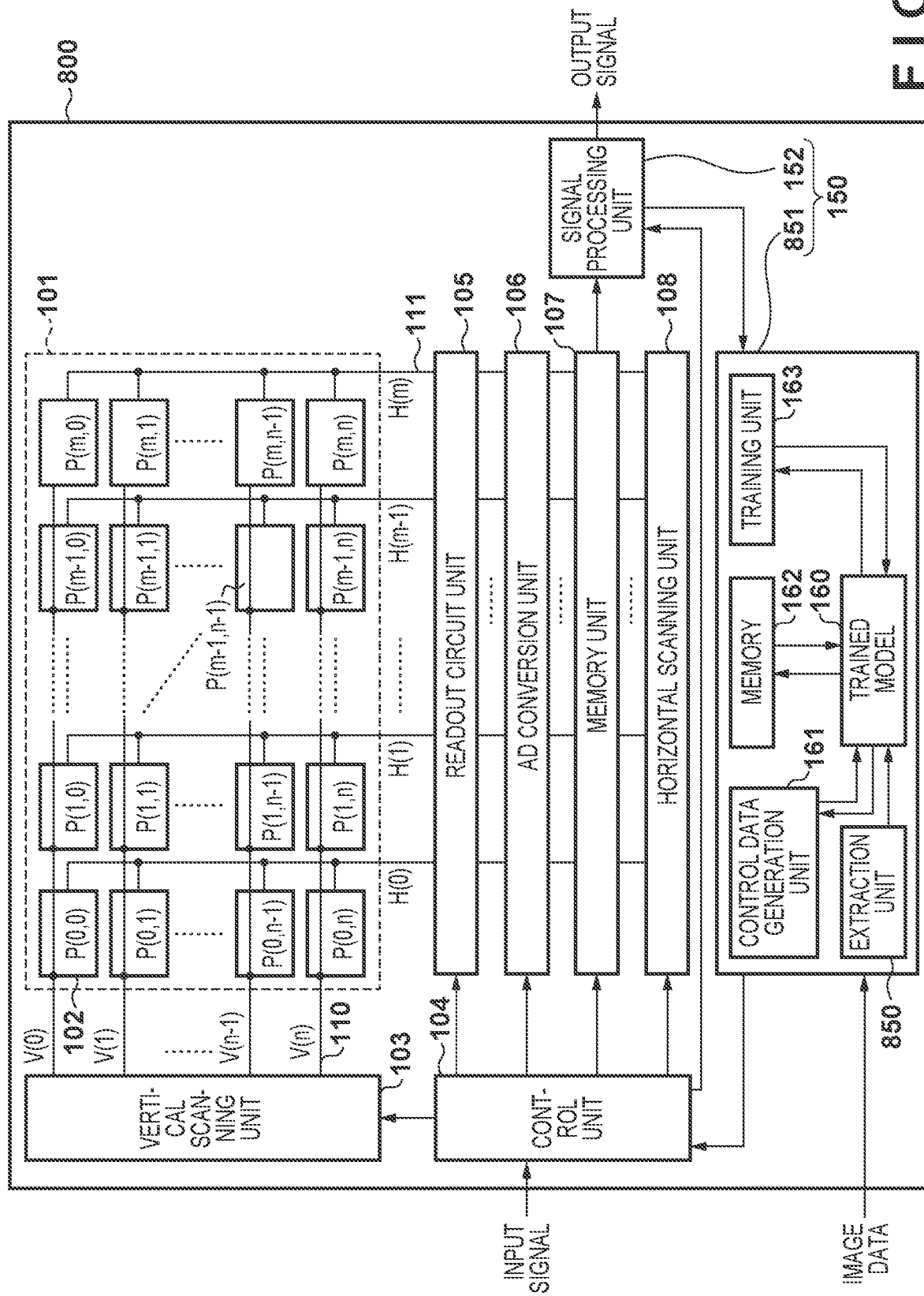
FIG. 8 is a diagram illustrating an example of the configuration of a photoelectric conversion apparatus including a signal processing apparatus according to an embodiment.

A signal processing apparatus according to a fourth embodiment of the present disclosure will be described with reference to FIGS. 8 and 9. FIG. 8 is a diagram illustrating an example of the configuration of a photoelectric conversion apparatus 800 including a signal processing apparatus 150 according to the present embodiment. The signal processing apparatus 150 of the present embodiment differs from the first embodiment described above in that the machine learning unit 151 of the signal processing apparatus 150 illustrated in FIG. 1 has been replaced with a machine learning unit 851. Compared to the machine learning unit 151, the machine learning unit 851 further includes an extraction unit 850. Because configurations aside from the configuration of the machine learning unit 851 may be the same as in the first embodiment described above, the following will focus on the points that differ from the first embodiment described above, and will omit descriptions of points that may be the same, as appropriate.

The foregoing first embodiment described inputting image data to each node in the input layer of the neural network of the trained model 160. In the present embodiment, however, the extraction unit 850 is provided in the machine learning unit 851, extracts a feature amount for improving the accuracy of the control data from the image data, and inputs the extracted feature amount into each node in the input layer of the neural network of the trained model 160. Rather than inputting the image data into the neural network of the trained model 160 as in the foregoing embodiments, information on the feature amount extracted from the image data is input to the neural network. Through this, using the trained model 160, the accuracy of the control data output to the signal processing unit 152 by the control data generation unit 161 can be improved, and the accuracy of the OB clamp processing can be improved as well. Although a case when only the feature amount is input to the trained model 160 will be described here, both the image data and the feature amount of that image data may be input to the neural network of the trained model 160.

Figure 9:
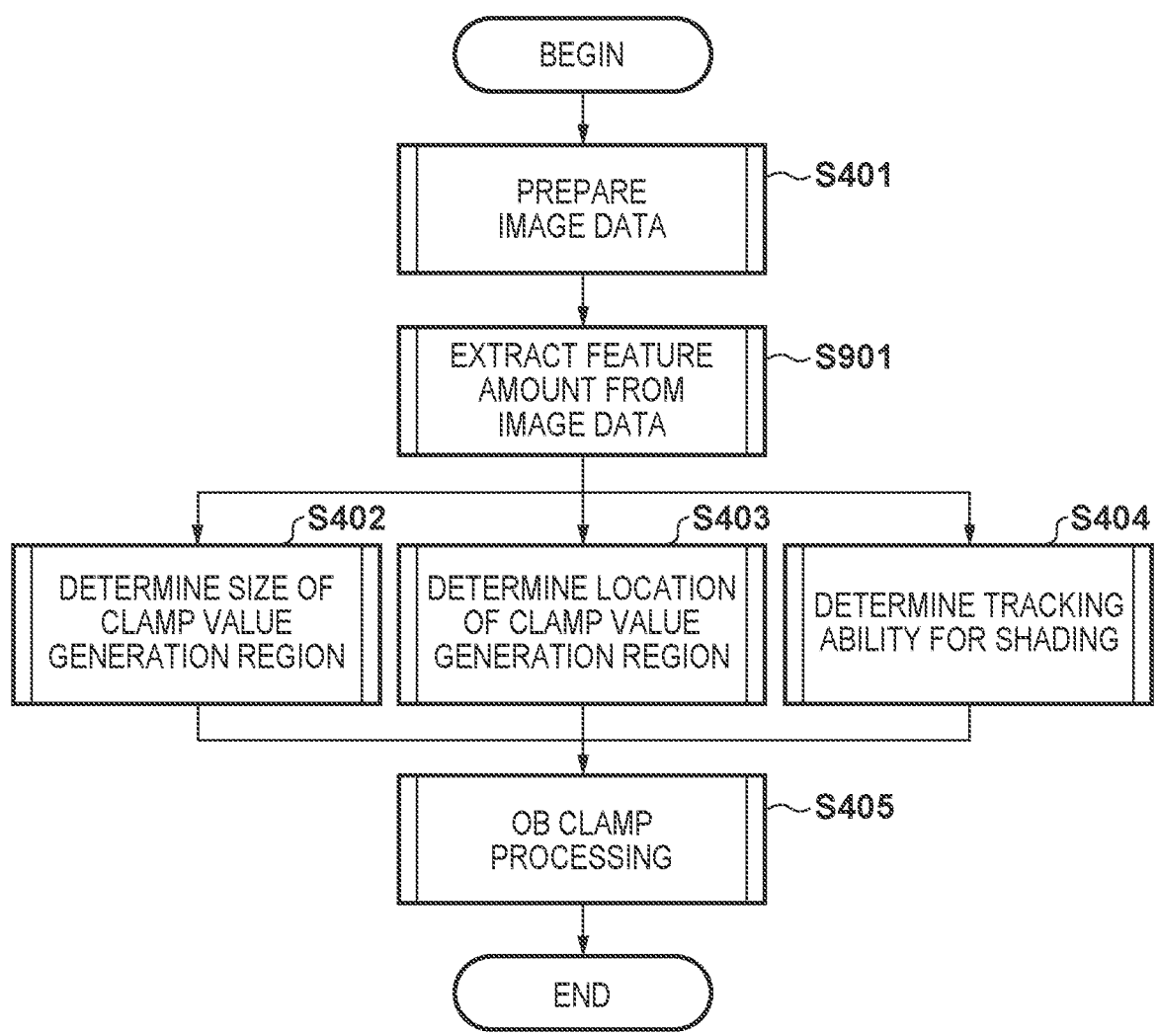
FIG. 9 is a flowchart illustrating the generation of control data used in the correction by the signal processing apparatus according to an embodiment.

FIG. 9 illustrates a process for generating the control data in the present embodiment. Compared to the process illustrated in FIG. 4, step S901, which is a step for extracting the feature amount of the image data, has been added. Steps aside from that step are the same as in FIG. 4, and descriptions thereof will therefore be omitted as appropriate.

Once the image data is prepared in step S401, the process moves to step S901, where the extraction unit 850 extracts a feature amount for improving the accuracy of the control data from the image data. The feature amount may be, for example, the amount of FPN noise in the light-blocked image data of the light-blocking region 201, for determining the size of the clamp value generation region. Alternatively, the feature amount may be, for example, the shape of shading in the light-blocked image data of the light-blocking region 201, for determining the location of the clamp value generation region. Furthermore, the feature amount may be, for example, the magnitude of the shading component in the light-blocked image data of the light-blocking region 201, for determining the tracking ability with respect to the shading. In addition, as mentioned above, stains, nonuniformities, and defects may reduce the accuracy of the clamp value. A step in the clamp value generation region may also reduce the accuracy of the clamp value. The "step" in the present embodiment can be a state in which the signal value has an offset at the boundary of a given row or a given column. Accordingly, the feature amount may be information of a pixel 102 that outputs an abnormal signal value in the light-blocked image data of the light-blocking region 201, for example. The extraction unit 850 inputs at least one of these types of information to the trained model 160 as the feature amount.

An example of a method for deriving he FPN noise amount in the light-blocked image data of the light-blocking region 201 will be described here. A plurality of instances of image data obtained under the same image capturing conditions are prepared. Each pixel value in these instances of image data is averaged in the time direction. A random noise component can be removed through this averaging. A given region is set in the light-blocked image data for the image data averaged in the time direction, and a standard deviation is calculated in that region. This standard deviation is the FPN noise amount in the light-blocked image data of the light-blocking region 201.

A method for deriving the shape of the shading, the magnitude of the shading component, and the like, in the light-blocked image data of the light-blocking region 201 is equivalent to the analysis performed by the analysis unit 750 in the foregoing third embodiment. Therefore, this will not be described here.

An example of a method for deriving the location of the pixel 102 outputting an abnormal signal value, such as a stain, a nonuniformity, a defect, the aforementioned step, or the like, in the light-blocked image data of the light-blocking region 201 will be described next. The light-blocked image data of the light-blocking region 201 is divided into arbitrary regions. For each of the regions obtained from the division, the average of the signal levels in the region is obtained. Among these, one region is selected, and the average value of the signal level in each region is normalized using the average value of the signal level of the selected region. At this time, a region where the average value deviates from the other regions can be determined to be a region where the pixel 102 that causes a stain, a nonuniformity, a defect, a step, or the like is present. Additionally, for example, information on a pixel 102 that outputs an abnormal signal value such as a stain, a nonuniformity, a defect, a step, or the like known at the time of shipment may be stored in the memory 162 or the like. Here, the information on the pixel 102 that outputs the abnormal signal value stored in the memory 162 may be location information of the pixel 102 that outputs the abnormal signal value, or the level of the signal value of the pixel 102 that outputs the abnormal signal value. Even after shipment, the information on the pixel 102 that outputs the abnormal signal value, extracted by the extraction unit 850 or the like, may be stored in the memory 162. This makes it possible to reduce the amount of computation performed by the extraction unit 850 when extracting the feature amount.

Upon extracting the feature amount, the extraction unit 850 inputs the feature amount to the trained model 160. Next, in steps S402 to S404, the control data generation unit 161 outputs, to the signal processing unit 152, the control data to be used by the signal processing unit 152 to perform the OB clamp processing, using the trained model 160 to which the feature amount has been input. Each setting value required for the OB clamp processing is determined on the basis of this information derived from the image data. Next, in step S405, the signal processing unit 152 generates the correction data on the basis of the control data determined in steps S402 to S404 and the light-blocked image data of the light-blocking region 201, and performs the OB clamp processing for correcting the light-received image data of the light-receiving region 202 in accordance with the correction data.

In the present embodiment, the training unit 163 and the extraction unit 850 are provided in the machine learning unit 851, but the configuration is not limited thereto. For example, the training unit 163 and the extraction unit 850 may be provided in the signal processing unit 152, or may be provided separately from the machine learning unit 151 and the signal processing unit 152.

The present embodiment improves the accuracy with which the control data generation unit 161 generates the control data by inputting the feature amount extracted from the image data into the neural network of the trained model 160. This makes it possible for the signal processing unit 152 to perform more appropriate OB clamp processing. In other words, the present embodiment can also accurately reduce FPN components, shading components, and the like, that vary depending on the image capturing conditions, the chip, and the like. This furthermore enables highly accurate OB clamp processing that can adapt to changes over time. As a result, in the present embodiment, an image having good image quality can be obtained.

The first embodiment to fourth embodiment described thus far can be combined with each other. For example, the trained model 160 may be updated using the data input from outside the signal processing apparatus 150 as the supervised data, and the feature amount of the image data may be input to the updated trained model 160. Additionally, for example, the trained model 160 may be updated using the data input from outside the signal processing apparatus 150 and the data analyzed as a result of the signal processing unit 152 performing the OB clamp processing as supervised data. Furthermore, for example, the trained model 160 may be updated using the data input from outside the signal processing apparatus 150 and the data analyzed as a result of the signal processing unit 152 performing the OB clamp processing as supervised data, and the feature amount of the image data may be input to the updated trained model 160.

Thus, by combining each of the foregoing embodiments, a trained model 160 that adapts with higher accuracy to FPN components, shading components, changes over time, and the like, which vary depending on the image capturing conditions, the chip, and so on, can be obtained. This makes it possible to realize a signal processing apparatus 150 that can perform highly-accurate OB clamp processing. In addition, the photoelectric conversion apparatuses 100, 600, 700, and 800 that incorporate the signal processing apparatus 150 of the present disclosure can obtain high-quality images.

Other Embodiments

The signal processing apparatus 150, which performs the OB clamp processing described in each of the foregoing embodiments, may be provided within the photoelectric conversion apparatus 100 as described above. However, the configuration is not limited thereto. For example, the signal processing apparatus 150 may be provided separately from the photoelectric conversion apparatus 100, the photoelectric conversion unit 101, and the like. The signal processing apparatus 150 may be a computer including a processor (e.g., a CPU or an MPU), such as a personal computer, provided separately from the photoelectric conversion apparatus 100. For example, the signal processing apparatus 150 may be a circuit such as an ASIC that implements the functions described above.

Figure 10:
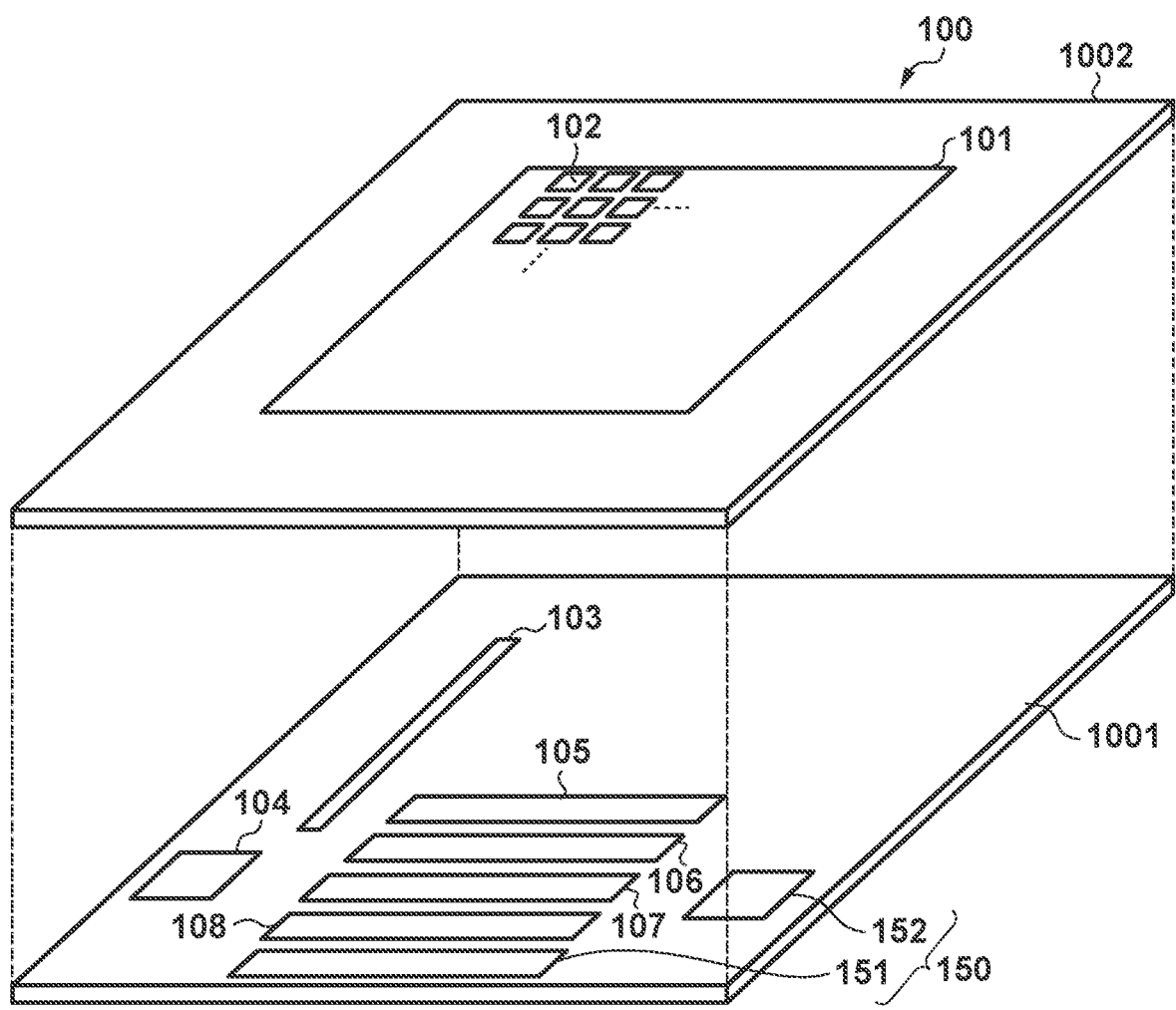
FIG. 10 is a diagram illustrating an example of the arrangement of the photoelectric conversion apparatus illustrated in FIG. 1.

FIG. 10 is a diagram illustrating an example of the arrangement of each block of the photoelectric conversion apparatus 100 illustrated in FIG. 1 on a substrate such as a semiconductor. The photoelectric conversion apparatus 100 may include a substrate 1001 and a substrate 1002 made of a semiconductor such as silicon. The signal processing apparatus 150, as well as constituent elements such as the vertical scanning unit 103, the control unit 104, the readout circuit unit 105, the AD conversion unit 106, the memory unit 107, and the horizontal scanning unit 108, are disposed on the substrate 1001. The photoelectric conversion unit 101, in which the pixels 102 including the light-receiving region 202 and the light-blocking region 201 are arranged in an array, is disposed on the substrate 1002. As illustrated in FIG. 10, the substrate 1001 and the substrate 1002 may be at least partially layered. According to this configuration, the appropriate process for manufacturing the photoelectric conversion apparatus 100 can be selected for an analog part, which includes the photoelectric conversion unit 101, and a logic part, which includes the signal processing apparatus 150. By using the appropriate manufacturing process for each part, favorable characteristics can be achieved in each part included in the photoelectric conversion apparatus 100. A photoelectric conversion apparatus 100 having improved image quality can be obtained as a result.

Figure 11:
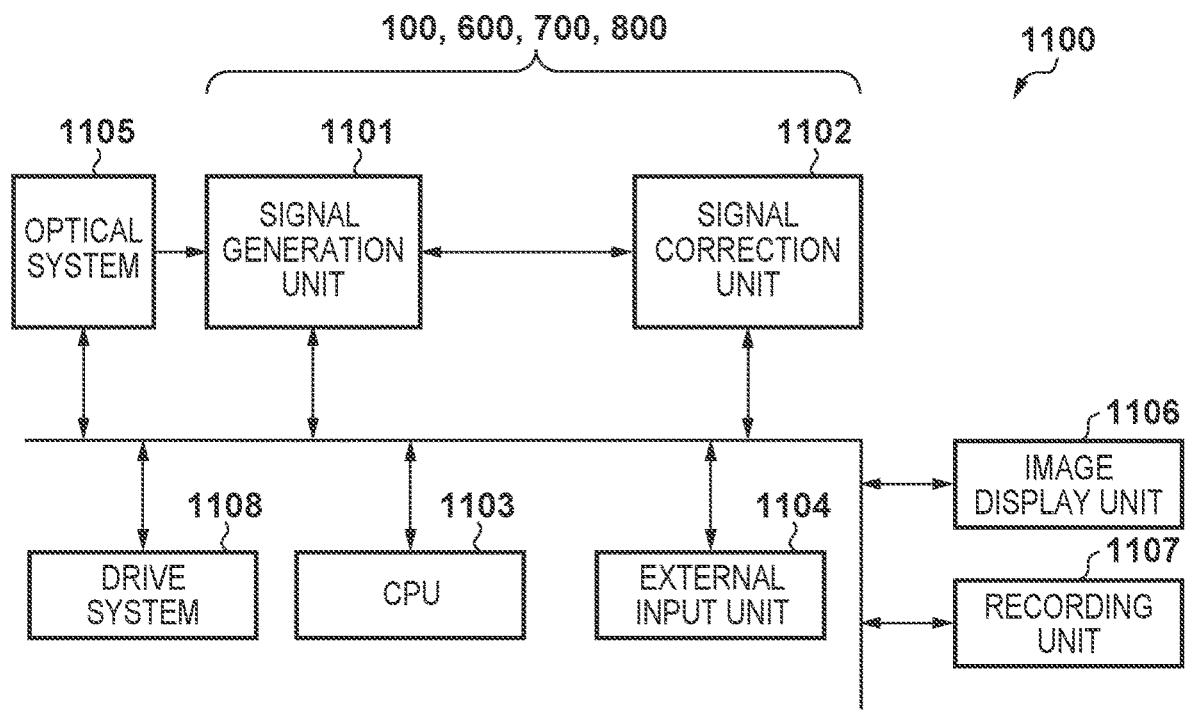
FIG. 11 is a diagram illustrating an example of an image capturing device incorporating the photoelectric conversion apparatus illustrated in FIG. 1.

FIG. 11 illustrates the configuration of an image capturing device 1100 as an example of the photoelectric conversion apparatuses 100, 600, 700, and 800 incorporating the above-described signal processing apparatus 150. The image capturing device 1100 includes a signal generation unit 1101, a signal correction unit 1102, a CPU 1103, an external input unit 1104, an optical system 1105, an image display unit 1106, a recording unit 1107, and a drive system 1108.

The signal correction unit 1102 can be the above-described signal processing apparatus 150. Additionally, the signal generation unit 1101 can include the various constituent elements described above, such as the photoelectric conversion unit 101 including the pixels 102, the vertical scanning unit 103, the control unit 104, the readout circuit unit 105, the AD conversion unit 106, the memory unit 107, and the horizontal scanning unit 108. Accordingly, the configuration including the signal generation unit 1101 and the signal correction unit 1102 can be the above-described photoelectric conversion apparatuses 100, 600, 700, and 800. In this configuration, the signal generation unit 1101 itself can be called a "photoelectric conversion apparatus" on its own. In other words, as described above, the signal processing apparatus 150 may be provided separately from the photoelectric conversion apparatus.

The signal generation unit 1101 performs photoelectric conversion and generates an analog image signal in accordance with light entering through the optical system 1105, which causes light to be incident on the photoelectric conversion unit 101 of the signal generation unit 1101, and outputs image data through AD conversion. The output image data is output to the image display unit 1106 and the recording unit 1107, and the signal correction unit 1102 performs correction processing so that the data can be stored. The image display unit 1106 uses display image data from after the correction process to display an image. The recording unit 1107 also stores the display image data. The CPU 1103 controls each of the above-described constituent elements in the image capturing device 1100. The drive system 1108 is provided, for example, to operate focus, aperture, and the like, of the optical system 1105. The external input unit 1104 can be various buttons for user inputs and operation, such as image capturing conditions, shutter operation, and the like. A touch panel may be provided as the image display unit 1106, and the image display unit 1106 may function as (part of) the external input unit 1104.

In addition to the constituent elements illustrated in FIG. 11, the image capturing device 1100 may include a configuration for obtaining other information about the environment aside from the images obtained by the signal generation unit 1101, such as a thermometer, for example. For example, the signal processing apparatus 150 may perform machine learning using information that cannot be obtained by the signal generation unit 1101 (the photoelectric conversion apparatus), such as temperature information, to construct the trained model 160. Using various environmental parameters of the environment in which the image capturing device 1100 is used can make it possible to implement OB clamp processing that more appropriately corresponds to the shooting conditions. The image quality of the images obtained by the image capturing device 1100 can be improved as a result.

Figure 12:
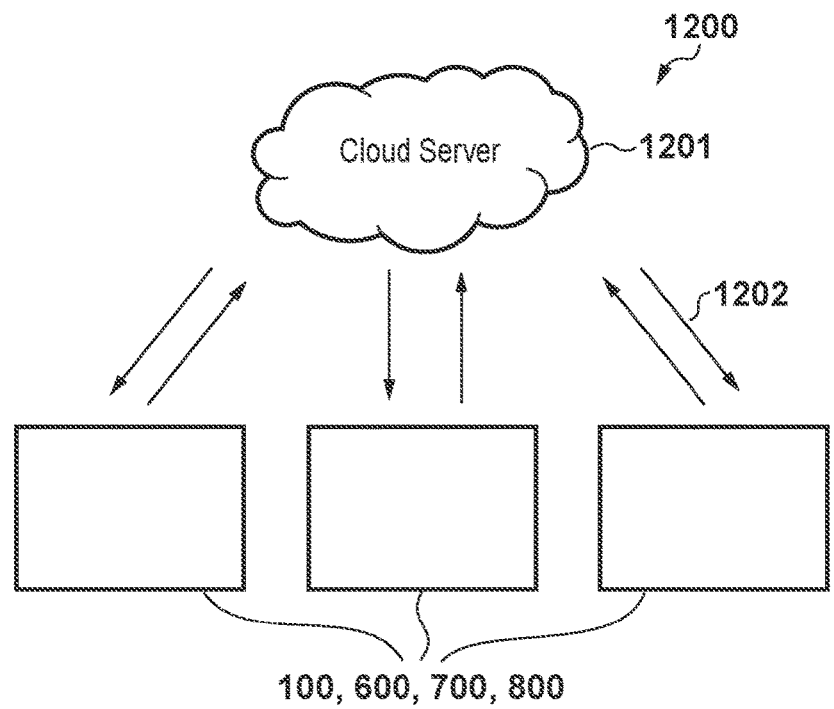
FIG. 12 is a diagram illustrating the configuration of a photoelectric conversion system including the photoelectric conversion apparatus illustrated in FIG. 1.

FIG. 12 is a diagram illustrating an example of the configuration of a photoelectric conversion system 1200 including a plurality of the photoelectric conversion apparatuses 100, 600, 700, and 800, and a communication unit 1202 for communicating with a server 1201 (e.g., a cloud server) outside the photoelectric conversion apparatuses 100, 600, 700, and 800. The communication unit 1202 may be realized by the photoelectric conversion apparatuses 100, 600, 700, and 800 having functions for communication, such as wireless LAN or Bluetooth (registered trademark). Additionally, the communication unit 1202 may be realized by the Internet or the like, where a user uploads or downloads various data that can be obtained by the photoelectric conversion apparatuses 100, 600, 700, and 800 to or from the server 1201. The communication unit 1202 can take on any form as long as data can be transferred between the photoelectric conversion apparatuses 100, 600, 700, and 800 and the server 1201 provided outside the photoelectric conversion apparatuses 100, 600, 700, and 800.

For example, the trained model 160 of the signal processing apparatus 150 in one of the photoelectric conversion apparatuses 100, 600, 700, and 800 may be shared among the plurality of photoelectric conversion apparatuses 100, 600, 700, and 800 via the server 1201. For example, when the photoelectric conversion apparatuses 100, 600, 700, and 800 are connected to the server 1201 via the communication unit 1202, the training unit 163 of the signal processing apparatus 150 may perform machine learning and update the trained model 160.

For example, the photoelectric conversion apparatus may include the signal processing apparatus 150 as described above, and the signal processing apparatus 150 may be provided in the server 1201. In other words, the trained model 160 generated through machine learning may be provided in the server 1201.

By having such a configuration, the photoelectric conversion system 1200 can update the trained model 160 using information from a plurality of photoelectric conversion apparatuses (e.g., the photoelectric conversion apparatuses 100, 600, 700, and 800). In other words, a photoelectric conversion apparatus used by a user who captures images under a large number and wide range of image capturing conditions is connected to the server 1201 of the photoelectric conversion system 1200. This makes it possible, for example, to acquire a large amount of supervised data in a short period of time. As a result, the accuracy of the OB clamp processing can be further improved, and the quality of the images captured by the respective photoelectric conversion apparatuses can be improved even further.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A signal processing apparatus that processes image data output from a photoelectric conversion unit including a light-receiving region and a light-blocking region, the apparatus comprising:
   a control data generation unit that outputs control data used to generate correction data for correcting the image data using a trained model generated through machine learning; and
   a signal processing unit that generates the correction data on the basis of light-blocked image data and the control data, the light-blocked image data being image data, among the image data, that is from the light-blocking region, and that corrects light-received image data in accordance with the correction data without applying the trained model, the light-received image data being image data, among the image data, that is from the light-receiving region.

2. The signal processing apparatus according to claim 1, wherein the image data is input to the trained model.

3. The signal processing apparatus according to claim 1, further comprising an extraction unit that extracts, from the image data, a feature amount for improving an accuracy of the control data,
   wherein the feature amount is input to the trained model.

4. The signal processing apparatus according to claim 3, wherein the feature amount includes at least one of an amount of fixed pattern noise in the light-blocked image data, a shape of shading in the light-blocked image data, a magnitude of a shading component in the light-blocked image data, and information on a pixel outputting an abnormal signal value in the light-blocked image data.

5. The signal processing apparatus according to claim 1, further comprising a training unit that updates the trained model through machine learning performed using the image data.

6. The signal processing apparatus according to claim 5, wherein the training unit updates the trained model by performing machine learning using data that is provided from outside the signal processing apparatus, and that is data in which noise has been reduced from the image data, as supervised data.

7. The signal processing apparatus according to claim 5, wherein the training unit updates the trained model by performing machine learning using data that is provided from outside the signal processing apparatus, and that is data based on the control data capable of reducing noise in the image data, as supervised data.

8. The signal processing apparatus according to claim 5, further comprising an analysis unit that analyzes a degree of reduction of noise in the correction data generated on the basis of the control data,
   wherein the training unit updates the trained model by performing machine learning using the degree of reduction of noise in the correction data, analyzed by the analysis unit, as supervised data.

9. The signal processing apparatus according to claim 8, wherein the machine learning is performed each time the signal processing unit generates the correction data.

10. The signal processing apparatus according to claim 1, wherein the control data includes at least one of information on a size of a region of the light-blocked image data from which the correction data is generated, information on a location of the region of the light-blocked image data from which the correction data is generated, or information on a tracking ability with respect to shading when generating the correction data.

11. A photoelectric conversion apparatus comprising:
    the signal processing apparatus according to claim 1; and
    a photoelectric conversion unit that includes a light-receiving region and a light-blocking region and that outputs image data processed by the signal processing apparatus.

12. The photoelectric conversion apparatus according to claim 11, wherein the photoelectric conversion apparatus includes a first substrate and a second substrate, and
    the signal processing apparatus is disposed on the first substrate, and the photoelectric conversion unit is disposed on the second substrate.

13. The photoelectric conversion apparatus according to claim 12,
    wherein the first substrate and the second substrate are at least partially layered.

14. A photoelectric conversion system comprising:
    the photoelectric conversion apparatus according to claim 11; and
    a communication unit for communicating with a server outside the photoelectric conversion apparatus,
    wherein the trained model is shared, via the server, with a trained model of a photoelectric conversion apparatus aside from the photoelectric conversion apparatus.

15. A photoelectric conversion system comprising:
    the signal processing apparatus according to claim 1;
    a plurality of photoelectric conversion apparatuses, each including a photoelectric conversion unit that includes a light-receiving region and a light-blocking region, and that outputs image data processed by the signal processing apparatus; and
    a communication unit that communicates between the signal processing apparatus and the plurality of photoelectric conversion apparatuses.

16. A control method of controlling a signal processing apparatus that processes image data output from a photoelectric conversion unit including a light-receiving region and a light-blocking region, the method comprising:
    outputting control data used to correct the image data using a trained model generated through machine learning;
    generating correction data on the basis of light-blocked image data and the control data, the light-blocked image data being image data, among the image data, that is from the light-blocking region; and correcting light-received image data in accordance with the correction data, the light-received image data being image data, among the image data, that is from the light-receiving region.

17. A non-transitory computer-readable storage medium storing a program that causes a computer to execute a control method of controlling a signal processing apparatus that processes image data output from a photoelectric conversion unit including a light-receiving region and a light-blocking region, the method comprising:
- outputting control data used to correct the image data using a trained model generated through machine learning;
- generating correction data on the basis of light-blocked image data and the control data, the light-blocked image data being image data, among the image data, that is from the light-blocking region; and
- correcting light-received image data in accordance with the correction data, the light-received image data being image data, among the image data, that is from the light-receiving region.

* * * * *